United States Patent [19]
Lee

[11] Patent Number: 5,861,686
[45] Date of Patent: Jan. 19, 1999

[54] DEVICE FOR GENERATING WAKING VIBRATIONS OR SOUNDS

[75] Inventor: Jong Bae Lee, Seoul, Rep. of Korea

[73] Assignee: Shinwood Audio Co. Ltd., Seoul, Rep. of Korea

[21] Appl. No.: 993,565

[22] Filed: Dec. 18, 1997

[30] Foreign Application Priority Data

Aug. 5, 1997 [KR] Rep. of Korea .................. 1997 21512

[51] Int. Cl.⁶ .............................. H02K 35/00; G08B 5/22
[52] U.S. Cl. .......................... 310/36; 310/71; 340/388.1; 381/396
[58] Field of Search .............................. 340/388.1, 388.3, 340/391.1; 381/396, 410; 368/230, 250; 310/36, 71, DIG. 6; 116/DIG. 44, 281

[56] References Cited

U.S. PATENT DOCUMENTS

| | | | |
|---|---|---|---|
| 4,240,002 | 12/1980 | Tosi et al. | 310/322 |
| 4,391,532 | 7/1983 | Hara | 368/250 |
| 5,172,092 | 12/1992 | Nguyen et al. | 340/311.1 |
| 5,467,323 | 11/1995 | Sone | 340/388.4 |
| 5,517,574 | 5/1996 | Tichy | 381/188 |
| 5,546,069 | 8/1996 | Holden et al. | 340/407.1 |
| 5,682,132 | 10/1997 | Hiroyoshi et al. | 340/407.1 |
| 5,747,906 | 5/1998 | Tajima et al. | 310/89 |

*Primary Examiner*—Nestor Ramirez
*Assistant Examiner*—Burt Mullins
*Attorney, Agent, or Firm*—Beveridge, Degrandi Weilacher & Young L.L.P.

[57] ABSTRACT

An integrated device, used for selectively generating waking vibrations or sounds in alarm watches or in communications equipment such as cellullar or pager phones, is disclosed. In the device, first and second vibration members are set in a ring case and respectively generate waking vibrations and waking sounds. The second vibration member is made of a synthetic resin film, with two inner terminals being connected to both ends of a coil. A lead panel integrally extends from the edge of the second vibration member, thus being exposed to the outside of the device. Two outer terminals are provided on the outside end of the lead panel and are connected to the inner terminals through copper wires, thus connecting the coil to a PCB. The second vibration member, originally used for generating waking sounds, is thus used as a circuit board for the coil.

1 Claim, 2 Drawing Sheets

DEVICE FOR GENERATING WAKING VIBRATIONS OR SOUNDS

BACKGROUND OF THE INVENTION

1. Field of the Invention

The present invention relates, in general, to an integrated device used for selectively generating waking vibrations or sounds in alarm watches or in communications equipment such as cellular or pager phones and, more particularly, to an integrated device provided with a vibration member for selectively generating waking sounds in the device, the vibration member being made of a synthetic resin film, thus being used as a circuit board for a coil of the device.

2. Description of the Prior Art

In typical communications equipment such as cellular or pager phones, a vibrator for generating calling vibrations is comprised of a pendulum, which is eccentrically mounted to the tip of the rotating shaft of a rotor with a stator surrounding the rotating shaft of the rotor. When the stator is turned on, the rotor is rotated along with the rotating shaft, thus making the pendulum eccentrically rotate while generating calling vibrations. Such typical cellular or pager phones also individually have a buzzer, which is separated from the above vibrator and is to generate calling sounds. The typical cellular or pager phones thus allow users to select the operational mode between a vibration mode and a sound mode.

Since both the vibrator, with both a long rotating shaft and a large-diameter stator, and the buzzer are separately provided in a cellular or pager phone, the typical cellular or pager phones regrettably fail to accomplish the recent trend of compactness, thinness, lightness and slimness of the phones. The separated vibrator and buzzer also increase the number of elements of the cellular or pager phones, thus complicating the production process and increasing the production cost of such phones.

In an effort to overcome such problems, an integrated device, used for selectively generating calling vibrations or calling sounds in cellular or pager phones, is proposed. Such a known integrated device has first and second vibration members, which are set in a ring case and are used for generating calling vibrations and calling sounds, respectively. However, the second vibration member, which is used for selectively generating calling sounds, is made of a thin metal plate, thus being somewhat, insensitive to frequency and generating dull sounds. Another problem of the known integrated device resides in that it has been provided with a separate circuit board for connecting a coil of the device to the PCB of a cellular or pager phone, thus failing to effectively overcome the problems caused by the separated vibrator and buzzer.

SUMMARY OF THE INVENTION

Accordingly, the present invention has been made keeping in mind the above problems occurring in the prior art. An object of the present invention is to provide an integrated device, which is used for selectively generating waking vibrations or sounds in alarm watches or in communications equipment such as cellular or pager phones, and of which the vibration member, originally used for selectively generating waking sounds in the device, is made of a synthetic resin film suitable for allowing the vibration member to be used as a circuit board for a coil of the device, thus reducing the number of elements, simplifying the production process and improving the layout flexibility of the device.

In order to accomplish the above object, the present invention provides a device for selectively generating waking vibrations or sounds in alarm watches or in communications equipment such as cellular or pager phones, comprising an electromagnet, a coil, first and second vibration members set in a ring case with both a cap and a bottom plate covering the top and bottom ends of the ring case, thus selectively generating waking vibrations by the first vibration member or waking sounds by the second vibration member in accordance with a frequency applied to the coil, wherein the second vibration member is made of a synthetic resin film and comprises: two inner terminals provided on the second vibration member and respectively connected to both ends of the coil; a lead panel integrally formed on the edge of the second vibration member and radially extending to the outside of the cap; and two outer terminals provided on the outside end of the lead panel and connected to a printed circuit board (PCB) of a watch or phone, the outer terminals being respectively connected to the inner terminals through copper wires, thus connecting the coil to the PCB.

BRIEF DESCRIPTION OF THE ACCOMPANYING DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

In the following description, the integrated device of this invention is used with, for example, communication equipment such as a cellular or pager phone. However, it should be understood that the integrated device may be preferably used with an alarm watch without affecting the functioning of this invention.

Figure 1:
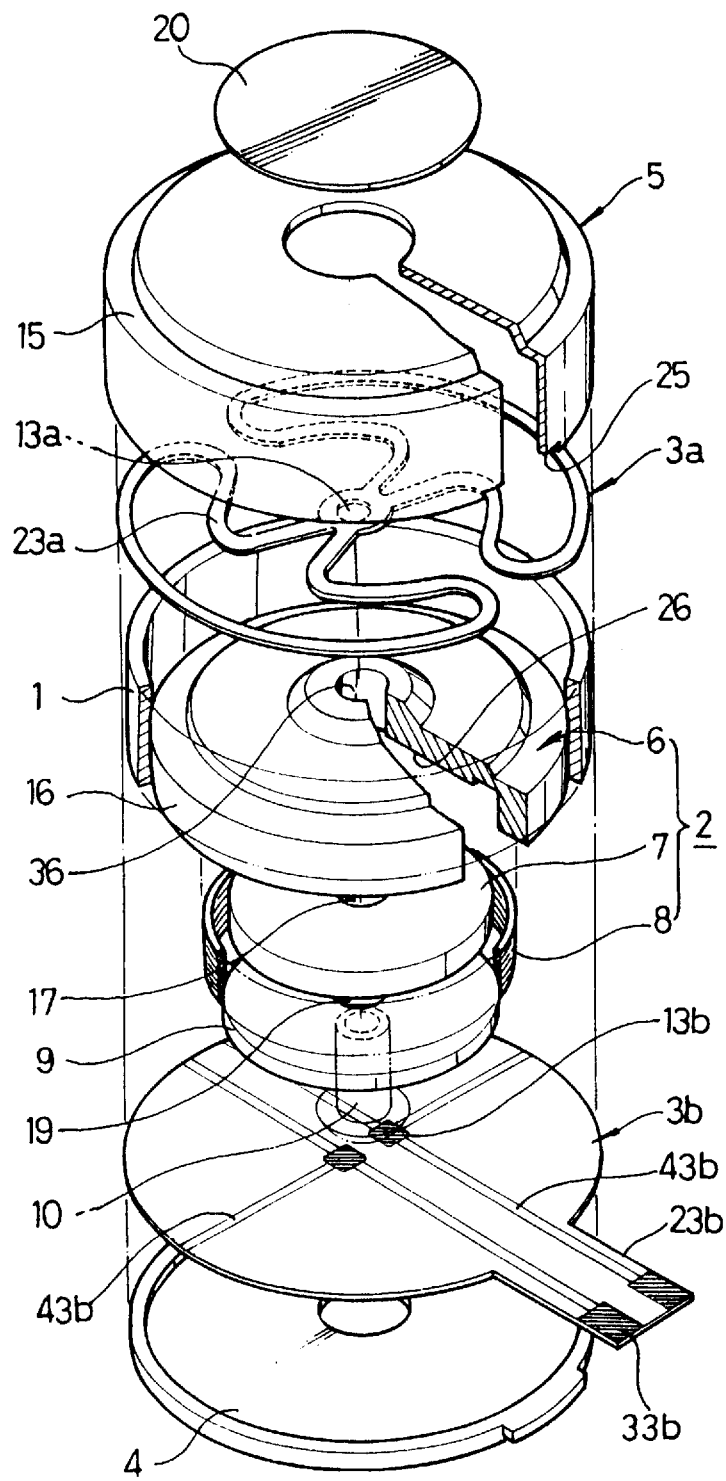
FIG. 1 is an exploded perspective view showing the construction of an integrated device for selectively generating the waking vibrations or sounds in alarm watches or in communications equipment such as cellular or pager phones in accordance with the preferred embodiment of the present invention.
Figure 2:
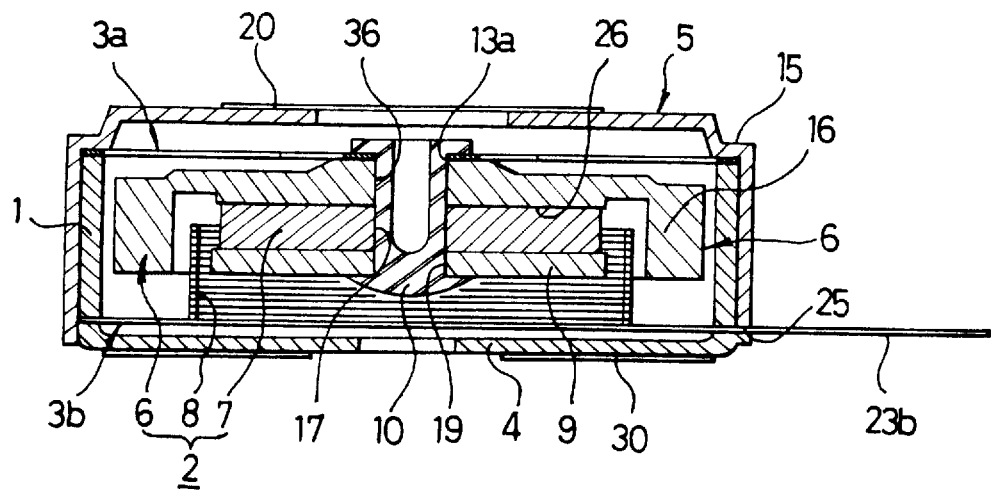
FIG. 2 is a sectional view of the assembled device of FIG. 1.
Figure 3:
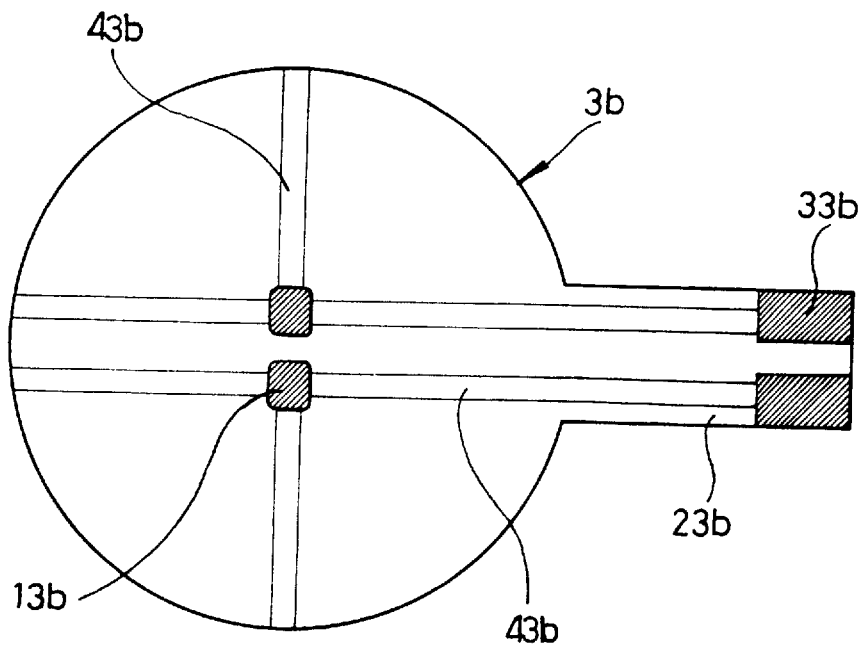
FIG. 3 is a plan view of a second vibration member included in the device of this invention, which is originally used for selectively generating waking sounds and is made of a synthetic resin film suitable for being used as a circut board for the coil of the device.

FIGS. 1 and 2 show the construction of an integrated device for selectively generating calling vibrations or sounds in cellular or pager phones in accordance with the preferred embodiment of this invention. As shown in the drawings, the device of this invention comprises one electromagnet 2 and two vibration members 3a and 3b, which are set in a ring case 1. The ring case 1, with both the electromagnet 2 and the two vibration members 3a and 3b, is, thereafter, covered with both a bottom plate 4 at its bottom and a cap 5 at it, top. Of the two vibration members 3a and 3b, the first member 3a is to generate calling vibrations, while the second member 3b is to generate calling sounds.

The ring case 1, which is a tublar member made of a nonconductive material, receives the first and second vibration members 3a and 3b prior to being covered with both the bottom plate 4 and the cap 5.

The electromagnet 2 is comprised of a yoke 6, an annular magnet 7 and an annular coil 8.

The yoke 6 is thinner than the height of the interior side wall of the ring case 1, with the side wall 16 of the yoke 6 having an inner diameter larger than the outer diameter of the coil 8. In the yoke 6, a magnet seat 26 is defined inside the wall 16. The annular magnet 7 is seated into the magnet seat 26 from the bottom to the top of the yoke 6, with a disc 9 being positioned under the magnet 7.

The first vibration member 3a is closely seated on the top of the yoke 6. The first vibration member 3a, the yoke 6, the magnet 7 and the disc 9 respectively have eyelet holes 13a, 36, 17 and 19 at their centers. In order to assemble the first vibration member 3a, yoke 6, magnet 7 and disc 9 into a single body, they are primarily arranged with the eyelet holes 13a, 36, 17 and 19 being aligned with each other. Thereafter, an eyelet 10 is fitted into the aligned holes 13a, 36, 17 and 19 prior to being caulked, thus integrating the vibration member 3a, yoke 6, magnet 7 and disc 9 into a single body.

The coil 8 is formed by winding coils into an annular shape of a certain diameter, which allows the coil 8 to be smoothly received into an annular opening defined between the inside surface of the yoke's side wall 16 and the outside surfaces of both the magnet 7 and the disc 9. The bottom of the coil 8 is concentrically attached to the top center of the second vibration member 3b, with both ends of the coil 8 being connected to two inner terminals 13b of the second vibration member 3b as will be described later herein.

The first vibration member 3a is comprised of a symmetric rib 23, which is geometrically-shaped and is symmetric around the holed center of the member 3a. The first vibration member 3a, with such a symmetric and geometric rib 23a, is easily vibrated at low frequencies, thus effectively generating calling vibrations when the device is set by a user into a vibration mode. The first vibration member 3a is seated on the top of the ring case 1 and is compressed by the stepped corner 15 of the cap 5 at its outside edge, thus being stably held at its position as best seen in FIG. 2.

Meanwhile, the second vibration member 3b is comprised of a thin disc, which is made of a synthetic resin film and has the same diameter equal to the outer diameter of the ring case 1. A lead panel 23b is integrally formed on the edge of the second vibration member 3b, thus radially extending outwardly from the edge of the member 3b. Two outer terminals 33b are provided on the outside end of the lead panel 23b and are electrically connected to the two inner terminals 13b through flat copper wires 43b, respectively. Therefore, the second vibration member 3b, which is originally used for generating calling sounds, is also used as a circuit board for the coil 8.

In the present invention, the copper wires 43b may be diametrically or spirally arrayed on the second vibration member 3b. In addition, the two inner terminals 13b may be freely positioned on such copper wires 43b without affecting the functioning of this invention.

The second vibration member 3b is interposed and compressed between the bottom end of the ring case 1 and the outside edge of the bottom plate 4, thus being stably held in the device. In such a case, the cap 5 is partially notched at its side wall, thus forming a notch 25 allowing the lead panel 23b to pass through when the member 3b is interposed and compressed between the bottom end of the ring case 1 and the bottom plate 4. Thereafter, the outer terminals 33b of the lead panel 23b are connected to a PCB (not shown) of a phone.

In the above description for the integrated device of this invention, it is noted that the construction of the ring case 1, magnet 2, first vibration member 3a, bottom plate 4 and cap 5 remains the same as in the prior art integrated device, but the second vibration member 3b is altered to be used as a circuit board for the coil 8.

That is, the second vibration member 3b of this invention is not made of a thin metal plate but is made of a synthetic resin film, with the lead panel 23b being integrated with the edge of the member 3b. In addition, two outer terminals 33b are provided on the outside end of the lead panel 23b, while two inner terminals 13b are provided on the second vibration member 3b. The two outer terminals 33b are electrically connected to the two inner terminals 13b through flat copper wires 43b, respectively. Therefore, the second vibration member 3b, which is originally used for generating calling sounds, is also used as a circuit board for the coil 8.

In the drawings, the reference numerals 20 and 30 denote a damper and a double-faced adhesive tape, respectively.

The elements of the above device are assembled into a single body as follows.

The annular magnet 7 is primarily seated into the magnet seat 26 of the yoke 6 from the bottom to the top prior to seating the disc 9 onto the bottom of the magnet 7. Thereafter, the first vibration member 3a are laid on the top of the yoke 6. In such a case, the first vibration member 3a, the magnet 7 and the disc 9 are arranged on the yoke 6, with their eyelet holes 36, 17, 19 and 13a being aligned with each other. Thereafter, an eyelet, 10 is fitted into the aligned eyelet holes 36, 17, 19 and 13a and integrates the vibration member 3a, yoke A, magnet 7 and disc 9 into a single body through, for example, a caulking process.

The coil 8 is integrated with the second vibration member 3b, with the bottom of the coil 8 being concentrically attached to the top center of the second vibration member 3b. In this case, both ends of the coil 8 are connected to the inner terminals 13b of the second vibration member 3b.

The integrated body, with the first vibration member 3a, yoke 6, magnet 7 and disc 9, is, thereafter, set into the ring case 1 from the top to the bottom of the case 1. The yoke 6 of the integrated body is thus suspended in the case 1 by the symmetric rib 23a of the first vibration member 3a being seated on the top of the case 1 at its outside edge. Thereafter, the position of the integrated body in the case 1 is fixed by the cap 5 which is forcibly and downwardly fitted over the case 1.

In such a case, the first vibration member 3a, which is seated on the top of the ring case 1, is compressed by the stepped corner 15 of the cap 5 at its outside edge, thus holding the integrated body at its position in the case 1.

The second vibration member 3b, with the coil 8, is set, into the case 1 from the bottom to the top of the case 1, with both the edge of the vibration member 3b being seated onto the bottom of the case 1 and the coil 8 being positioned inside the case 1. In such a case, the notch 25 of the cap 5 allows the lead panel 23b of the second vibration member 3b to pass through. Therefore, the lead panel 23b extends to the outside of the cap 5 without causing any interference between the lead panel 23b and the cap 5, Thereafter, the bottom plate 4 is fitted into the bottom end of the case 1, thus forming an integrated device of this invention as shown in FIG. 2.

When the elements are assembled into an integrated device as described above, the coil 8 is smoothly received into the annular opening defined between the inside wall 16 of the yoke 6 and the outside surfaces of both the magnet 7 and the disc 9. Therefore, when an electromagnetic force is generated between the coil 8 and the magnet 7 and vibrates the two vibration members 3a and 3b, the coil 8 does not interfere with the yoke 6, magnet 6 or disc 9.

During a process of producing a cellular or pager phone, the integrated device of this invention is set in the phone using the tapes 30. In addition, the outer terminals 33b of the lead panel 23b of the second vibration member 3b are connected to the PCB (not shown) of the phone, Due to such a second vibration member 3b, the integrated device of this invention effectively connects the coil 8 to the PCB of the phone while being free from any separate circuit board.

In the operation of the above device, a user freely select, one of the two modes: a vibration mode performed by the first vibration member 3a and a sound mode performed by the second vibration member 3b. When a user selects one of the two modes, the PCB of the cellular or pager phone outputs a high or low frequency to the coil 8 of the device in response to a calling signal output from a microprocessor of the phone. In this case, the output frequency is automatically controlled by the PCB in accordance with a selected mode of the device.

Due to such a frequency applied from the PCB to the coil 8 of the device, an electromagnetic field is formed between the magnet 7 and the coil 8, thus moving both the yoke 6 and the coil 8 in the axial direction of the case 1 while selectively vibrating either of the two vibration members 3a and 3b.

In such a case, the vibrating direction of each member 3a, 3b is equal to the vibrating direction of both the yoke 6 and the coil 8 or the axial direction of the eyelet 10.

When the operational mode of the device is set into a vibration mode, the PCB of the phone outputs a low frequency (about 120 Hz) to the coil 8 of the device, thus causing the first vibration member 3a to be vibrated. In this case, the vibrations of the member 3a are similar to the beating vibrations of fingers and are clearly sensed by a user. Meanwhile, when the operational mode of the device set into a sound mode, the PCB of the phone outputs a high frequency (about 2 kHz) to the coil 8, thus causing the second vibration member 3b to be vibrated with the coil 8. In this case, the second vibration member 3b is quickly vibrated by the high frequency, thus generating prominent vibration sounds or calling sounds.

In the above description, the integrated device of this invention is used with a cellular or pager phone. However, it should be understood that the integrated device may be preferably used with an alarm watch as described at the beginning of the description. When the device of this invention is used with an alarm watch, it is necessary to give select buttons to the device, thus allowing a user to select the operational mode of the device between vibration and sound modes.

As described above, the present invention provides an integrated device for selectively generating waking vibrations or sounds in alarm watches or in communications equipment such as cellular or pager phones. In the above device, two vibration members are set, in a ring case and respectively respond to low and high frequencies, thus generating waking vibrations and waking sounds. In the present invention, the second vibration member, which is originally used for selectively generating waking sounds in the device, is made of a synthetic resin film and is provided with inner and outer terminals connected to each other through a copper wire, thus being used as a circuit board for the coil of the device. Therefore, the present invention reduces the number of elements, simplifies the production process and improves the layout flexibility of the device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for selectively generating waking vibrations or sounds in alarm watches or in communications equipment such as cellular or pager phones, comprising an electromagnet, a coil, first and second vibration members set in a ring case with both a cap and a bottom plate covering the top and bottom ends of the ring case, thus selectively generating waking vibrations by said first vibration member or waking sounds by said second vibration member in accordance with a frequency applied to said coil, wherein said second vibration member is made of a synthetic resin film and comprises:

two inner terminals provided on said second vibration member and respectively connected to both ends of said coil;

a lead panel integrally formed on the edge of said second vibration member and radially extending to the outside of said cap; and two outer terminals provided on the outside end of said lead panel and connected to a PCB (printed circuit board) of a watch or a phone, said outer terminals being respectively connected to said inner terminals through copper wires, thus connecting said coil to the PCB.

* * * * *

UNITED STATES PATENT AND TRADEMARK OFFICE
CERTIFICATE OF CORRECTION

PATENT : 5,861,686
DATED : December 18, 1997
INVENTOR(S) : Jong Bae Lee

It is certified that error appears in the above-identified patent and that said Letters Patent is hereby corrected as shown below:

IN THE TITLE PAGE:

In field [73], please change the information as follows:

from

[73] Assignee:
    Shinwood Audio Co. Ltd., Seoul, Rep. of Korea to

[73] Assignee:
    Shinwoo Audio Co. Ltd., Seoul, Rep.of Korea

Signed and Sealed this

Third Day of April, 2001

*Attest:*

NICHOLAS P. GODICI

*Attesting Officer*    *Acting Director of the United States Patent and Trademark Office*